US008104933B2

(12) United States Patent
Liu et al.

(10) Patent No.: US 8,104,933 B2
(45) Date of Patent: Jan. 31, 2012

(54) CONNECTOR FOR CONNECTING LAMP TO SUPPORT

(75) Inventors: You-Xue Liu, Shenzhen (CN); Ci-Jin Mo, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 163 days.

(21) Appl. No.: 12/761,400

(22) Filed: Apr. 16, 2010

(65) Prior Publication Data

US 2011/0122634 A1 May 26, 2011

(30) Foreign Application Priority Data

Nov. 20, 2009 (CN) .......................... 2009 1 0310125

(51) Int. Cl.
*F21S 8/00* (2006.01)
*F16L 3/00* (2006.01)

(52) U.S. Cl. ........ 362/427; 362/418; 362/431; 362/432; 362/287; 248/124.1; 248/125.2

(58) Field of Classification Search .................. 362/418, 362/427, 428, 431, 432, 449, 285, 287, 289; 248/121, 122.1, 124.1, 125.1, 125.2, 125.3, 248/295.11
See application file for complete search history.

(56) References Cited

U.S. PATENT DOCUMENTS 4,240,603 A * 12/1980 Chiariello .................. 248/125.9
4,932,620 A * 6/1990 Foy ............................ 248/124.1
5,128,838 A * 7/1992 Brandess ........................ 362/18
5,982,340 A * 11/1999 Troche .......................... 343/882
6,037,913 A * 3/2000 Johnson ......................... 343/882
6,390,424 B1 * 5/2002 Kidushim et al. .......... 248/122.1
7,066,619 B2 * 6/2006 Waters .......................... 362/147
7,566,150 B2 * 7/2009 Adrien .......................... 362/418
8,007,142 B2 * 8/2011 Ku et al. ........................ 362/368
8,021,013 B2 * 9/2011 Russo et al. .................. 362/150

* cited by examiner

*Primary Examiner* — Ali Alavi
(74) *Attorney, Agent, or Firm* — Altis Law Group, Inc.

(57) ABSTRACT

A connector for connecting a lamp to a pole, includes a frame and a bracket pivotably attached to the frame. The frame has multiple positioning holes defined therein, and the bracket has two slots defined corresponding to the positioning holes. A blot extends through the frame and the bracket, and a screw is selected to extend through one of the positioning holes and a corresponding slot to fix the bracket to the frame with a required angle.

17 Claims, 7 Drawing Sheets

CONNECTOR FOR CONNECTING LAMP TO SUPPORT

BACKGROUND

1. Technical Field

The present disclosure relates to a connector and, more particularly, to a connector capable of connecting a lamp to a support in various orientations.

2. Description of Related Art

Lamps are widely used in road, street, square, courtyard and other outdoor locations for providing illumination to vehicles or passerby on the roads. The lamps are generally supported by supporting devices, often in the form of pole, at corresponding places of these locations. The poles may have their top ends inclined from an upright direction by predetermined mounting angles so that the lamps connected to the top ends of the poles can properly project the light to target areas on the ground by the help of the mounting angles.

However, the mounting angles of the top ends of poles are conventionally fixed; that is to say, as soon as the lamps are connected to the poles, the light-output direction of the lamps in respect to the ground is also fixed. This causes limitations to the utility of the lamps since the position of the target needing to be illuminated by the lamps may change.

What is needed, therefore, is a connector for connecting a lamp to a support which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
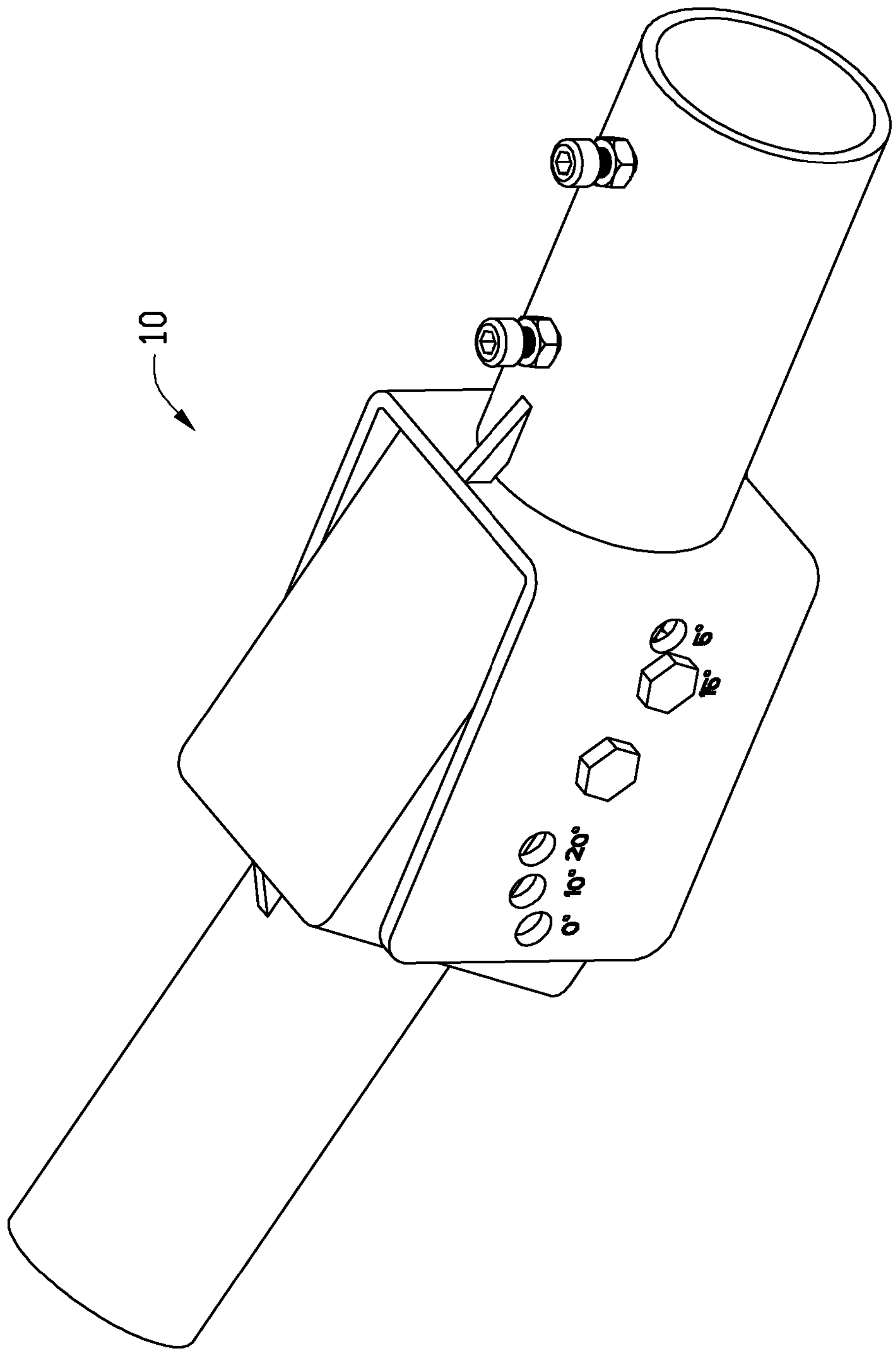
FIG. 1 is an isometric view of a connector of this disclosure.
Figure 2:
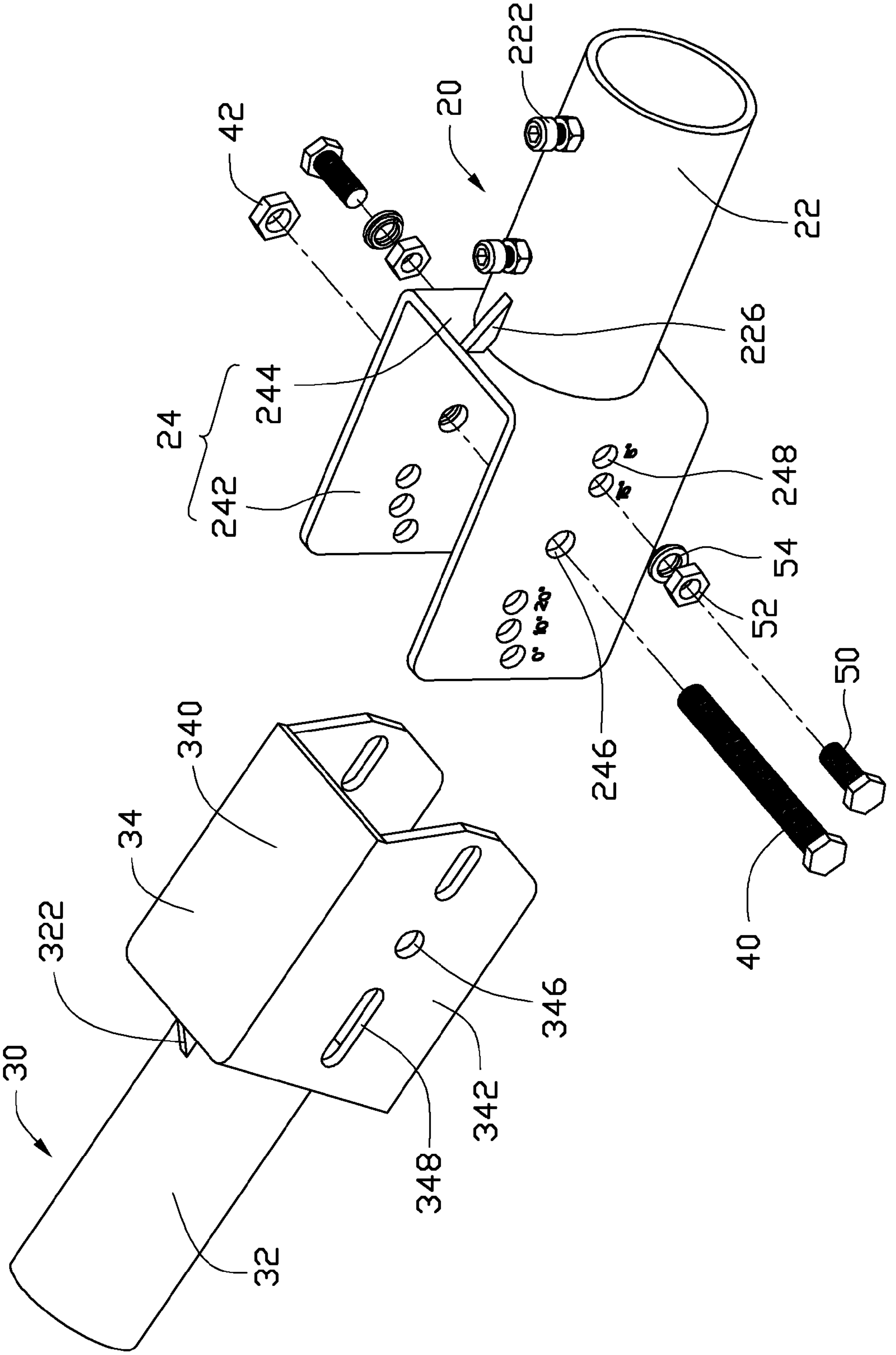
FIG. 2 is an exploded view of the connector of FIG. 1
Figure 3:
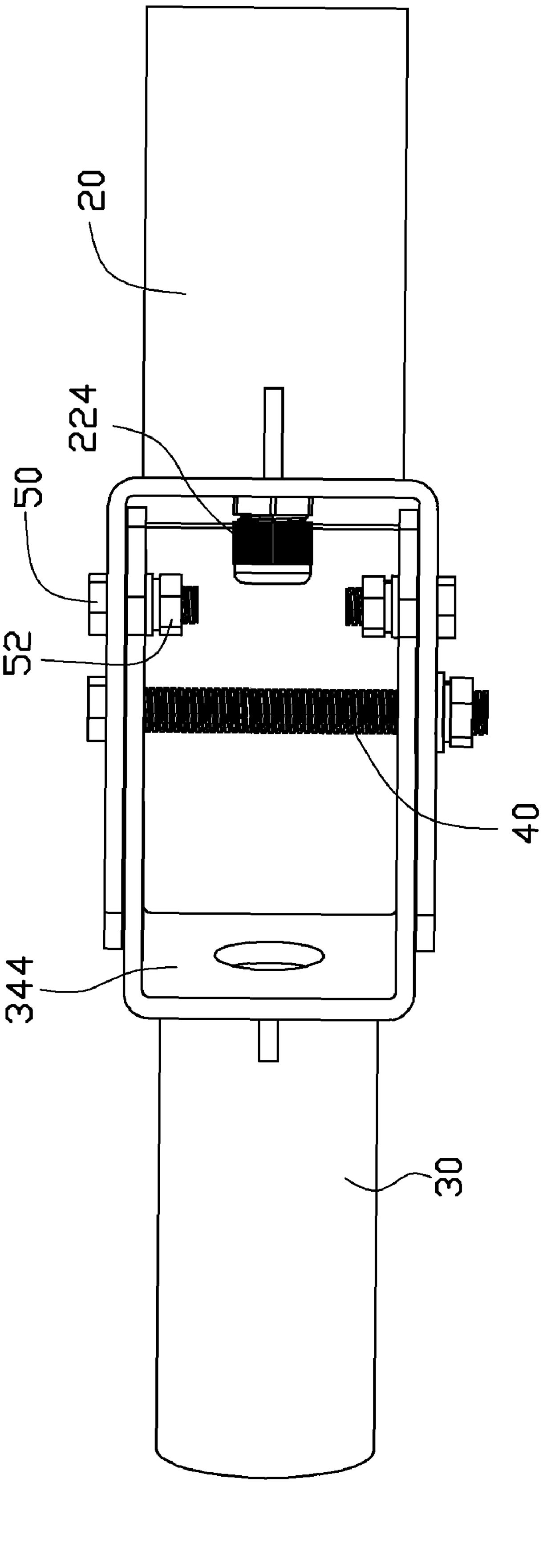
FIG. 3 shows a bottom of the connector of FIG. 1.
Figure 4:
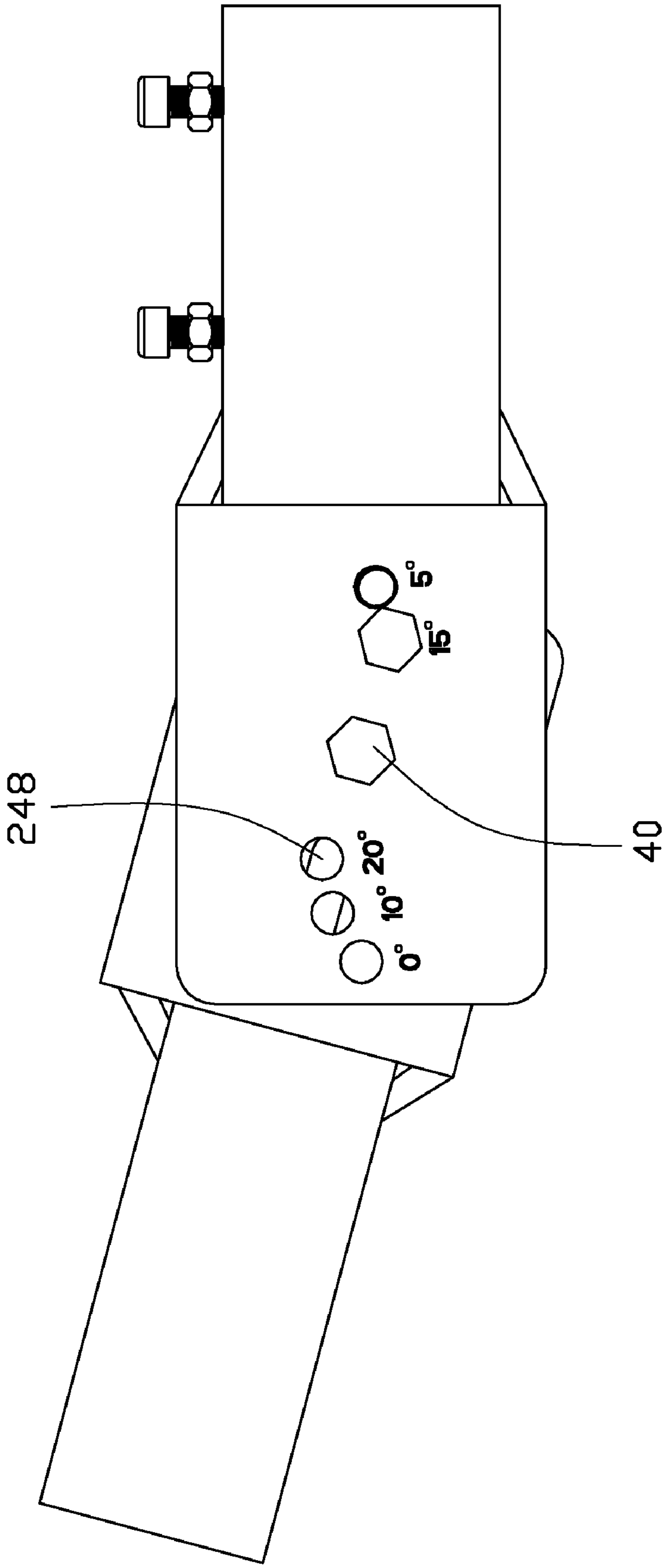
FIG. 4 shows a front of the connector of FIG. 1.

Referring to FIGS. 1-4 and 7, a connector 10 of the present disclosure for connecting a lamp 60 to a pole 70 is disclosed. The connector 10 includes a frame 20 and a bracket 30 pivotably connected to the frame 20. The frame 20 includes a first mounting portion 24 and a first sleeve 22 extending from the first mounting portion 24 towards a right direction. The first mounting portion 24 includes a rectangular front sidewall 242, a rectangular rear sidewall 242 parallel to the front sidewall 242 and a rectangular right sidewall 244 connecting the front sidewall 242 and the rear sidewall 242. The front sidewall 242 and the rear sidewall 242 have the same configurations, whereby only the front sidewall 242 would be illustrated below for brevity. The front sidewall 242 has a pivoting hole 246 defined in a center thereof and a plurality of positioning holes 248 defined around the pivoting hole 246. The pivoting hole 246 is for insertion of a bolt 40 to the front sidewall 242. Two positioning holes 248 are located at a right of the pivoting hole 246, wherein one of the two positioning holes 248 near the pivoting hole 246 is marked with an angle of 15°, and the other one of the two positioning holes 248 remote from the pivoting hole 246 is marked with an angle of 5°. The scales of 5° and 15° present that the bracket 30 could be fixed to the frame 20 with these angles defined therebetween. The positioning hole 248 of 5° is located at a level lower than the pivoting hole 246, and the positioning hole 248 of 15° is lower than the positioning hole 248 of 5°. Three positioning holes 248 are located at a left of the pivoting hole 246, being marked with 20°, 10° and 0° along a right-left direction, respectively. The three positioning holes 248 are higher than the pivoting hole 246, and levels of the positions holes 248 of 0°, 10° and 20° are sequentially raised. The first sleeve 22 is perpendicular to and connected to the right sidewall 244. The first sleeve 22 is for receiving a top end of the pole 70 to thereby secure the connector 10 to the pole 70. The first sleeve 22 has two screws 222 fixed on a top thereof. The two screws 222 can be screwed inwardly to press against the pole 70 to further reinforce connection of the connector 10 to the pole 70 after the top end of the pole 70 is received in the first sleeve 22. A pair of first beams 226 couple the top and a bottom of the first sleeve 22 to the right sidewall 244, respectively. A waterproof port 224 is formed inwardly from the right sidewall 244 for allowing an electrical wire from the pole 70 through the connector 10 into the lamp 60.

The bracket 30 includes a second mounting portion 34 and a second sleeve 32 extending from the second mounting portion 34 along a left direction. The second mounting portion 34 includes a front plate 342, a rear plate 342 parallel to the front plate 342, a left plate 344 and a top plate 340 interconnecting the front plate 342, the rear plate 342 and the left plate 344. A distance between the front and rear plates 342 is less than that between the front and rear sidewalls 242 so that the second mounting portion 34 could be received in the first mounting portion 24. The front plate 342 and the rear plate 342 also have identical configurations, so only the front plate 342 would be discussed below. The front plate 342 has a through hole 346 defined in a center thereof and two slots 348 defined at left and right sides of the through hole 346. The through hole 346 is aligned with the pivoting hole 246 in the front sidewall 242, whereby the bolt 40 could extend through the through holes 346 of the bracket 30 and the pivoting holes 246 of the frame 20 to pivotably secure the bracket 30 to the frame 20. A nut 42 is provided to threadedly engage with a rear end of the bolt 40 protruding out of the connector 10, preventing the bolt 40 from loosing from the connector 10. The two slots 348 are aligned with the pivoting hole 346, wherein a left slot 348 is designed corresponding to the three left positioning holes 248 and a right slot 348 is designed corresponding to the two right positioning holes 248. The left slot 348 is longer than the right slot 348. A screw 50 can be brought to selectively extend through one of the positioning holes 248 and into a corresponding slot 348, to thereby secure the bracket 30 to the frame 20 at a required angle. A nut 52 and a gasket 54 are further provided to engage with a rear end of the screw 50 projecting out of the front plate 342 of the bracket 30, to thereby secure the bracket 30 to the frame 20. The second sleeve 32 has an inner diameter less than that of the first sleeve 22. The second sleeve 32 can be fittingly inserted into a head 62 of the lamp 60 to fix the lamp 60 to the connector 10. A pair of second beams 322 connect a top and a bottom of the second sleeve 32 to the left plate 344.

Figure 5:
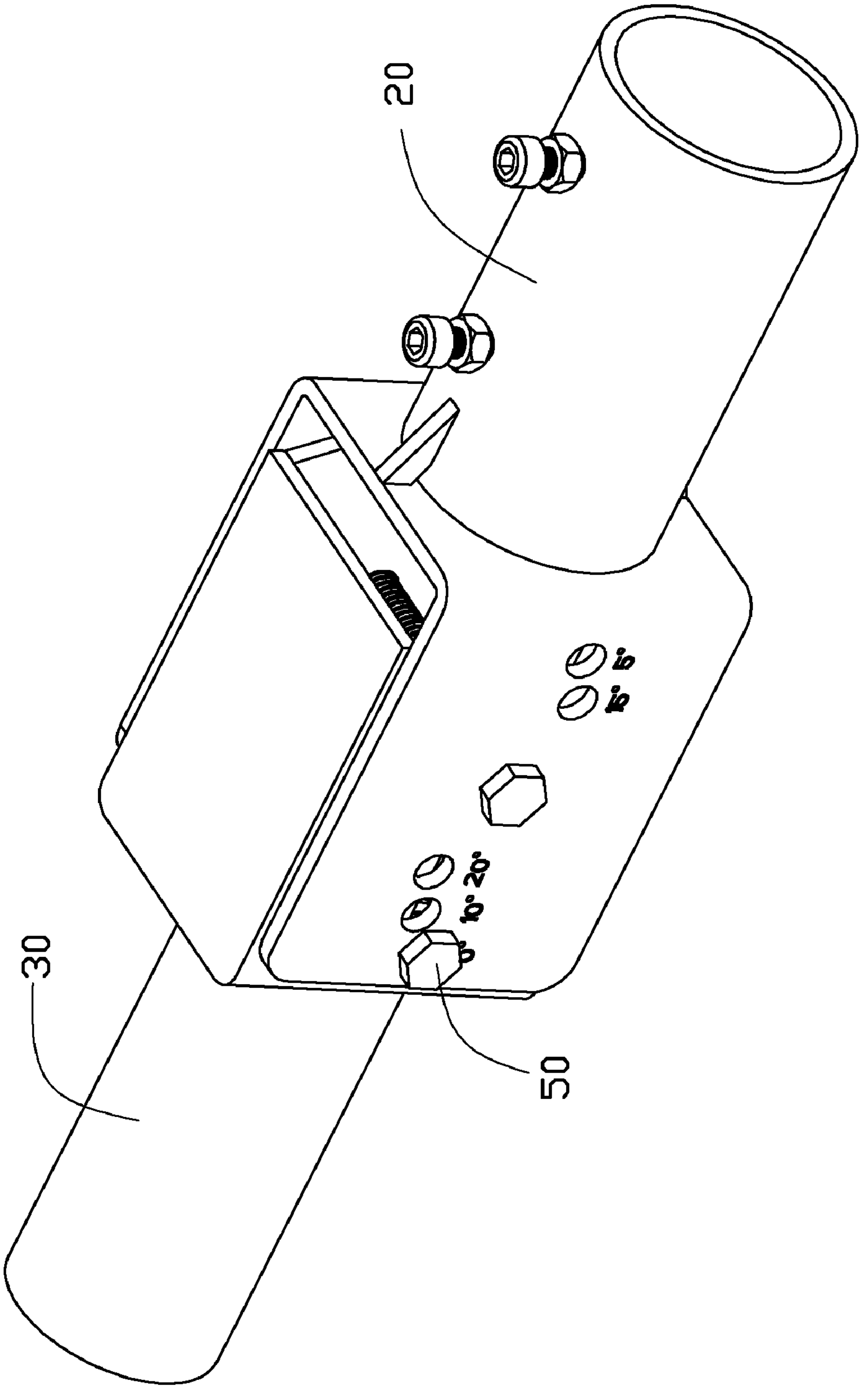
FIG. 5 is similar to FIG. 1, wherein a bracket of the connector is rotated to be in alignment with a frame of the connector of FIG. 1.
Figure 6:
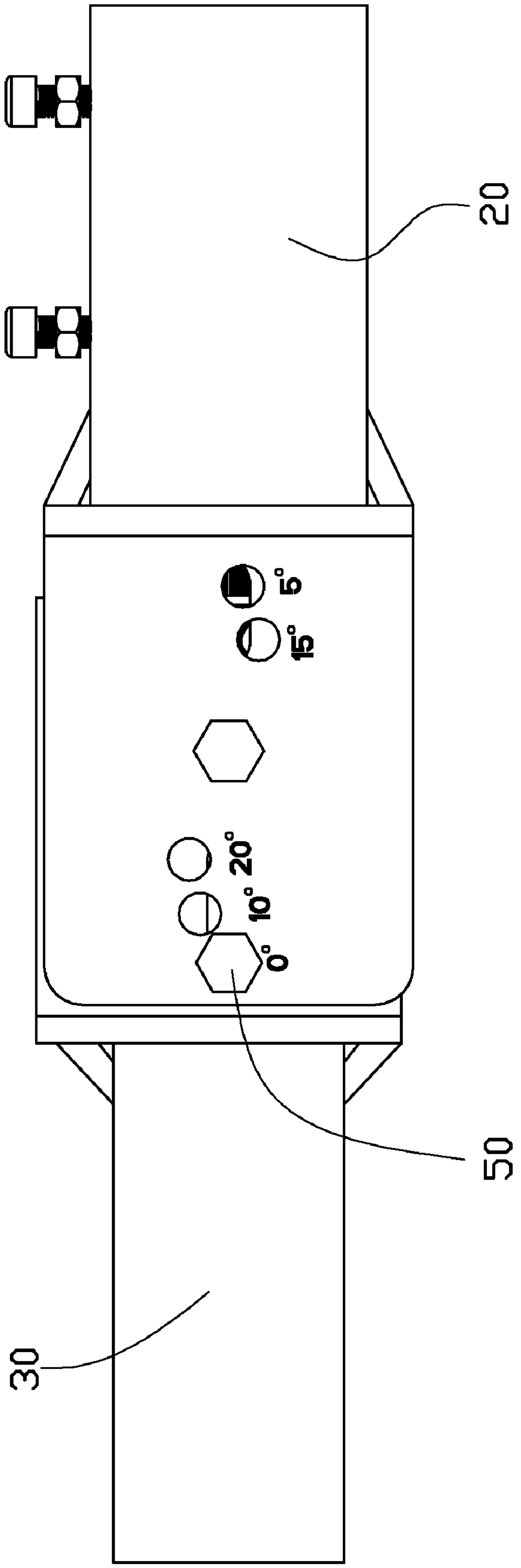
FIG. 6 shows a front of the connector of FIG. 5.
Figure 7:
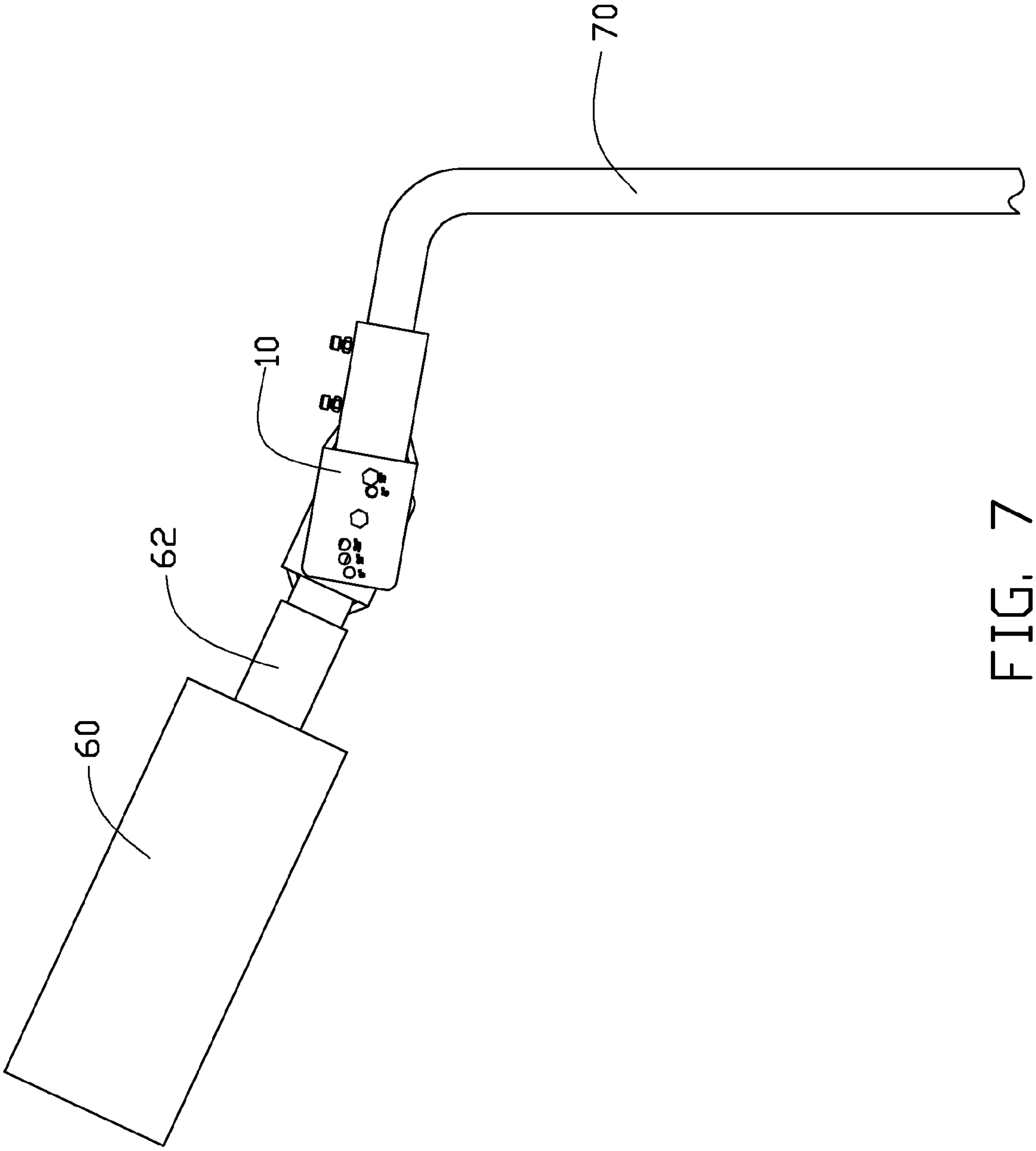
FIG. 7 shows the connector of FIG. 1 connecting a lamp to a pole.

Also referring to FIGS. 5-6, since the screw 50 can be selected into different positioning holes 248 to secure the bracket 30 to the frame 20 at different angles, the lamp 60 connected to the bracket 30 can be flexibly adjusted to project light towards different areas of the ground below the lamp 60. For example, the screw 50 can extend into the positioning hole 248 of 0° to fix the bracket 30 in line with the frame 20 as shown in FIGS. 5-6. Thus, the connector 10 can help the lamp 60 to have more flexible illumination orientations compared with the conventional lamp.

It is believed that the present disclosure and its advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. A connector for connecting a lamp to a support, comprising:

a frame for connecting with the support; and a bracket for connecting with the lamp, the bracket being pivotably connected to the frame;

wherein one of the frame and the bracket comprises a plurality of positioning holes, and the other one of the frame and the bracket comprises at least one slot; and wherein a fastener is selectable to extend through one of the plurality of positioning holes and the at least one slot each time so that the bracket is able to be fixed to the frame with different angles between the bracket and the frame.

2. The connector as claimed in claim 1, wherein a bolt extends through the bracket and the frame, the bracket being pivotable to the frame around the bolt.

3. The connector as claimed in claim 2, wherein the plurality of positioning holes are located at two opposite sides of the bolt.

4. The connector as claimed in claim 3, wherein the positioning holes located at one of the two opposite sides of the bolt are all located lower than the bolt, and the positioning holes located at the other one of the two opposite sides of the blot are all located higher than the bolt.

5. The connector as claimed in claim 4, wherein the positioning holes located at the one of the two opposite sides of the bolt have levels sequentially decreasing in a direction towards the bolt.

6. The connector as claimed in claim 4, wherein the positioning holes located at the other one of the two opposite sides of the bolt have levels sequentially increasing in a direction towards the bolt.

7. The connector as claimed in claim 1, wherein the frame comprises two parallel first sidewalls and a second sidewall interconnecting the two first sidewalls, the positioning holes being defined in at least one of the two first sidewalls.

8. The connector as claimed in claim 7, wherein the frame further comprises a first sleeve connected to the second sidewall, the sleeve being for receiving an end of the support therein.

9. The connector as claimed in claim 8, wherein a pair of beams connect two opposite sides of the first sleeve to the second sidewall of the frame, respectively.

10. The connector as claimed in claim 8, wherein a waterproof port is formed on the second sidewall.

11. The connector as claimed in claim 7, wherein the at least one slot comprises two slots in line with each other, the bolt being located between the two slots.

12. The connector as claimed in claim 11, wherein the bracket comprises two parallel first plates and a second plate interconnecting the two first plates, the two slots being defined in at least one of the two first plates.

13. The connector as claimed in claim 12, wherein the bracket further comprises a second sleeve connected to the second plate, the second sleeve being for insertion into the lamp.

14. The connector as claimed in claim 13, wherein an inner diameter of the second sleeve is less than that of the first sleeve.

15. The connector as claimed in claim 12, wherein the bracket further comprises a third plate connected to the two first plates and the second plate, the third plate being perpendicular to the first plates and the second plate.

16. The connector as claimed in claim 1, wherein the bracket is partially received in the frame.

17. The connector as claimed in claim 1, wherein the support is a lamp pole.

* * * * *